United States Patent [19]

Itoh et al.

[11] Patent Number: 4,470,272
[45] Date of Patent: Sep. 11, 1984

[54] HERMETICALLY CIRCULATING, ABSORPTION TYPE REFRIGERATOR

[75] Inventors: Masahiko Itoh, Hitachiota; Heihatiro Midorikawa; Akira Minato, both of Hitachi; Kenzi Machizawa, Ibaraki, all of Japan

[73] Assignee: Hitachi, Ltd., Tokyo, Japan

[21] Appl. No.: 411,810

[22] Filed: Aug. 26, 1982

[30] Foreign Application Priority Data

Sep. 4, 1981 [JP] Japan ................................ 56-138452

[51] Int. Cl.$^3$ ............................................. F25B 43/00
[52] U.S. Cl. ......................................... 62/474; 252/68
[58] Field of Search .................... 62/474, 112; 252/67, 252/68, 389 R

[56] References Cited

U.S. PATENT DOCUMENTS 3,555,841 1/1971 Modahl et al. .................... 62/474 X
4,019,992 4/1977 Krueger ............................ 62/112 X
4,311,024 1/1982 Itoh et al. ............................. 62/474

Primary Examiner—Lloyd L. King
Attorney, Agent, or Firm—Antonellli, Terry & Wands

[57] ABSTRACT

In a hermetically circulating, absorption type refrigerator based on a closed circulation system of constituent members comprised of a successive communication of a regenerator, a condenser, an evaporator, an absorber and a heat exchanger, refrigeration being produced by repetitions of concentration, refrigerant dilution, and heat exchange of an aqueous concentrated lithium bromide solution sealed in the circulation system, the aqueous concentrated lithium bromide solution contains at least one each of (a) an inhibitor having a boiling point higher than the solution temperature in the regenerator and (b) an inhibitor having a boiling point lower than the solution temperature in the regenerator. Corrosion of metallic materials used in a refrigerant circulation loop of the refrigerator and those in the absorbing solution circulation loop can be effectively prevented.

5 Claims, 1 Drawing Figure

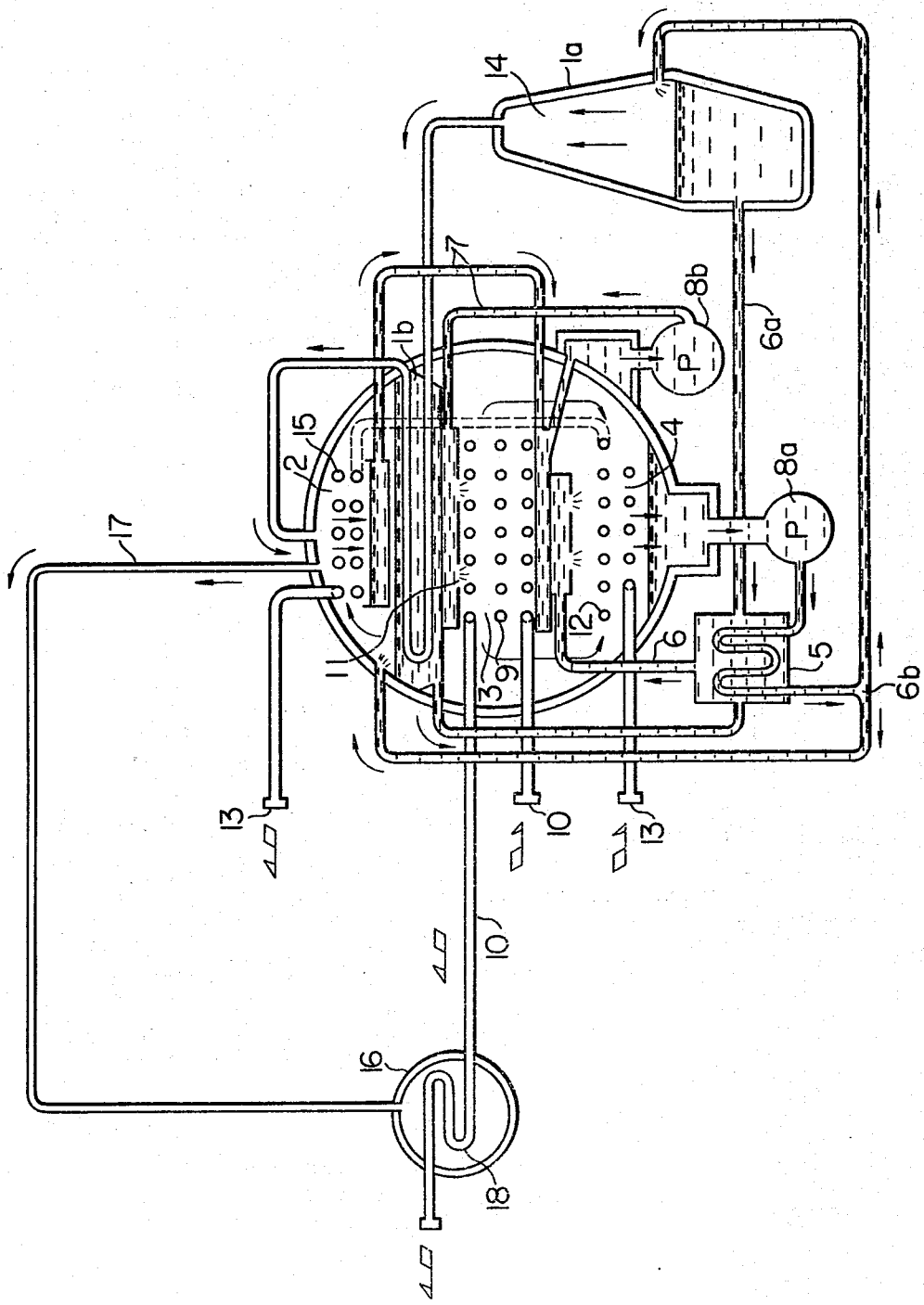

HERMETICALLY CIRCULATING, ABSORPTION TYPE REFRIGERATOR

BACKGROUND OF THE INVENTION

The present invention relates to a hermetically circulating, absorption type refrigerator, where refrigeration is produced by repetitions of concentration, refrigerant dilution, and heat exchange of an aqueous lithium bromide solution as an absorbing solution.

The hermetically circulating, absorption type refrigerator uses water as a refrigerant and an aqueous concentrated lithium bromide solution as an absorbing solution. Principle of such a refrigerator will be explained below, referring to the accompanying drawing.

The FIGURE shows a schematic view showing the principle of a typical hermetically circulating absorption type refrigerator of double effect.

As shown in the FIGURE, the refrigerator comprises regenerators 1a and 1b, condenser 2, evaporator 3, absorber 4, pumps 8a and 8b for circulating absorbing solution 6, 6a and 6b and refrigerant 7, respectively, heat exchanger 5, and an evacuation tank 16. The respective members work as follows:

(A) Evaporator 3

Cold water 10 passes through an evaporator tube bundle 9 of evaporator 3, and refrigerant 7 supplied by refrigerant pump 8b is sprayed onto the outside of the evaporator tube bundle through spray nozzles 11. Heat is deprived from the cold water by the latent heat of evaporation of the refrigerant.

(B) Absorber 4

An aqueous lithium bromide solution has a considerably lower vapor pressure than that of water at the same temperature, and can absorb water vapor generated at a considerably low temperature. The refrigerant vapor generated in evaporator 3 is absorbed into the aqueous lithium bromide solution 6 sprayed as absorbing solution onto the outside surface of cooling tube bundle 12 of absorber 4, and the generated heat of absorption is deprived by cooling water 13 passing through the cooling tube bundle 12.

(C) Regenerators 1a and 1b

Dilute absorbing solution 6b whose lithium bromide concentration has been lowered by absorption of the refrigerant in absorber 4 has a decreased water absorbability, and thus is partly led to high temperature regenerator 1a by absorbing solution circulation pump 8a and heated therein by a gas burner, etc. to evaporate the refrigerant into refrigerant vapor 14 while concentrating the absorbing solution, and the concentrated lithium bromide solution 6a is returned to absorber 4. A portion of the dilute solution from absorber 4 is led to low temperature regenerator 1b by absorbing solution circulation pump 8a, heated and concentrated by hot refrigerant vapor 14 generated in high temperature regenerator 1a and mixed with the concentrated solution from high temperature regenerator 1a to produce concentrated solution 6, which is returned to absorber 4.

(D) Condenser 2

Hot refrigerant vapor 14 from high temperature regenerator 1a releases a portion of its heat in low temperature regenerator 1b and enters into condenser 2, and is cooled therein by cooling water 13 passing through a cooling tube bundle 15, and condensed into liquid refrigerant 7, which is returned to evaporator 3.

(E) Heat exchanger 5

Dilute solution 6b at the low temperature flowing toward high temperature regenerator 1a and low temperature regenerator 1b from absorber 4 is preheated by concentrated solution 6a at the high temperature flowing toward absorber 4 from high temperature regenerator 1a and low temperature regenerator 1b to reduce the heating requirement of regenerator 1a.

(F) Pumps 8a and 8b

Absorbing solution circulation pump 8a circulates an aqueous lithium bromide solution as an absorbing solution, and refrigerant circulation pump 8b circulates water as a refrigerant.

(G) Evacuation tank 16

Cold water 10 obtained in evaporator 3 passes through cooling tube 18 in evacuation tank 16, and the inside pressure in the evacuation tank is kept lower than that in condenser 2, consequently the water vapor in condenser 2 is withdrawn therefrom through evacuation line 17 by suction, and the inside of the condenser 2 can be kept under a subatmospheric pressure.

Absorber 4, regenerators 1a and 1b and pumps 8a and 8b perform the same function as that of a compression-type refrigerator. Absorbing solution circulates through the absorbing solution circulation loop comprised of regenerators 1a and 1b and absorber 4 through heat exchanger 5 during the operation of refrigerator. The higher the concentration of absorbing solution, generally the higher the refrigeration efficiency. Thus, in order to concentrate the absorbing solution, it is necessary to maintain the regenerators at a higher temperature. On the other hand, the higher the temperature and concentration of absorbing solution, i.e. aqueous lithium bromide solution, the higher the corrosion of steel or copper as the materials of construction for a refrigerator. Thus, it is indispensable to add an inhibitor to the absorbing solution to prevent the corrosion.

For example, a chromate is added to the absorbing solution as an inhibitor for suppressing corrosion. Recently, an organic compound such as triazole compounds is used together as the inhibitor (Japanese Laid-open Patent Application No. 124897/75, and U.S. Pat. No. 4,311,024). These inhibitors are substantially involatile under the operating conditions of the refrigerator, and are circulated together with the obserbing solution throughout the refrigerator to prevent corrosion of the parts in contact with the absorbing solution.

However, prevention of the refrigerant circulation loop comprised of the condenser and the evaporator of the absorption type refrigerator from corrosion has been so far overlooked. The said organic inhibitors are also high boiling compounds and are practically not evaporated in the regenerator together with evaporation of water.

However, the carbon steel is corroded even by water as the refrigerant, and thus corrosion products are accumulated or suspended in the refrigerant during a continued operation, resulting in clogging of spray nozzles or deposition on the surfaces of evaporation tubes of evaporator and consequent deterioration of evaporation efficiency.

SUMMARY OF THE INVENTION

An object of the present invention is to effectively prevent corrosion of metallic parts including those in the absorbing solution circulation loop and the refrigerant circulation loop in a hermetically circulating, absorption-type refrigerator.

The said object of the present invention can be attained by using an aqueous concentrated lithium bromide solution containing at least one each of (a) an inhibitor having a boiling point higher than the solution temperature in the regenerator and (b) an inhibitor having a boiling point lower than the solution temperature in the regenerator as an absorbing solution.

The present invention provides a hermetically circulating, absorption type refrigerator based on a closed circulation system of constituent members comprised of a successive communication of a regenerator, a condenser, an evaporator, an absorber and a heat exchanger, refrigeration being produced by repetitions of concentration, refrigerant dilution, and heat exchange of an aqueous concentrated lithium bromide solution sealed in the circulation system, wherein an improvement comprises the aqueous concentrated lithium bromide solution containing at least one each of (a) an inhibitor having a boiling point higher than the solution temperature in the regenerator and (b) an inhibitor having a boiling point lower than the solution temperature in the regenerator.

That is, in the present invention, an absorbing solution containing at least one of inhibitors capable of being vaporized together with a refrigerant under the operating conditions of the regenerator and at least one of the so far well known high boiling inhibitors is used, and the present invention is particularly effective for hermetically circulating, absorption type refrigerators of single effect, double effect and triple effect.

The inhibitors so far used in the absorbing solution for an absorption type refrigerator is a high boiling compound that is stable under the operating conditions of a high temperature regenerator, and practically involatile, that is, remains in the absorbing solution without vaporization to prevent corrosion of materials of construction such as carbon steel. For example, the highest temperature conditions in the regenerator or regenerators of absorption type refrigerators are given below:

|  | Highest temp. (°C.) | Highest pressure (mmHg) |
|---|---|---|
| Single effect refrigerator | 120 | 300 |
| Double effect refrigerator | 170 | 580 |
| Triple effect refrigerator | 210 | 3,120 |

The typical inhibitors applicable to such conditions, which will be hereinafter referred to as "high boiling inhibitor", are given below, where the highest boiling point for the high boiling inhibitor in generally above the temperature of a high temperature regenerator in the triple effect refrigerator and generally has a vapor pressure at 30° C. of below 1 mmHg:

(1) For a triple effect refrigerator:

Inorganic inhibitors such as chromates, molybdates, nitrates, nitrites, tungstates, etc.

(2) For a double effect refrigerator:

In addition to the inorganic inhibitors as given in the above item (1), inorganic inhibitors such as borates, ruthenium chloride, etc., and organic inhibitors such as benztriazole, tolyltriazole, etc.

(3) For a single effect refrigerator:

In addition to the inhibitors mentioned in the above items (1) and (2), inorganic inhibitors such as silicates, phosphates, etc., and organic inhibitors such as 1,3-diethyl-2-thiourea, thiosinamine, sodium thiocyanate, diphenylthiocarbazide, 1-acetyl-2-thiourea, etc., According to the present invention, a low boiling inhibitor, which can be vaporized in a regenerator or evaporator during the operation of the absorption-type refrigerator, is used together with the said high boiling inhibitor. That is, the low boiling inhibitor is added to the absorbing solution in advance, and then the resulting absorbing solution is charged into the refrigerator. The low boiling inhibitor is vaporized together with water as the refrigerant, and the resulting vapor mixture is led to a condenser, where the mixture is cooled and liquefied, or absorbed into condensate water, and the resulting condensate mixture is led to an evaporator. The mixture is again vaporized in the evaporator, and the vapors are led to an absorber, where they are absorbed and dissolved in the absorbing solution. Then, the absorbing solution is led to the regenerator through a heat exchanger.

In this manner, the low boiling inhibitor circulates in the refrigerant circulation loop through the absorbing solution circulation loop together with the refrigerant in a vapor or condensate state, while inhibiting corrosion of materials of construction of equipments in the refrigerant circulation loop, particularly condenser and evaporator.

As is obvious from the foregoing, the low boiling inhibitor is one of a plurality of inhibitors to be added to an absorbing solution containing lithium bromide as the major component, and is at least one of the low boiling inhibitors must be used in the present invention. It is desirable that an effective amount of a low boiling inhibitor is contained in a refrigerator, and generally it is preferable that a low boiling inhibitor is contained therein at a concentration of 100 ppm by weight.

The boiling point of low boiling inhibitor can be set to be below the regenerator temperature of a single effect refrigerator, that is, below 120° C., or to be above a vapor pressure at 30° C. of 3 mmHg, preferably of about 20 mmHg. Since the regenerator temperature depends upon the effect type of refrigerator, that is, the regenerator of single effect refrigerator, that of double effect refrigerator and that of triple effect regenerator, as described before, an appropriate low boiling inhibitor can be selected in view of the effect type of refrigerator. In the selection of a low boiling inhibitor, its inertness to the components and other inhibitors of an absorbing solution must be taken into account.

The low boiling inhibitor includes imine compounds, for example, morpholine, pyrrolidine, 2-methylpyrrolidine, 3-methylpyrrolidine, piperidine, 2-methylpiperidine, hexamethyleneimide, etc. The primary amine compounds known as an organic inhibitor are also appropriate low boiling compounds, but the lower amines tend to promote corrosion of copper or copper alloy used in parts of a refrigerator in contact with the refrigerator. Thus, it is desirable to avoid such use as much as possible. The imine compounds have no such practical trouble at all.

Furthermore, thiol compounds such as mercaptoacetic acid, etc. and thiazole compounds such as tiazole, isothiazole, etc. can be used as the low boiling inhibitor. In addition, any compound having the desirable boiling point and an effective corrosion prevention upon copper and iron-based materials can be used in the present invention as the low boiling inhibitor.

The high boiling inhibitor takes part in corrosion prevention of the absorbing solution circulation loop, and mainly prevents iron-based materials in the regenerator that is exposed to most vigorous corrosion, and also prevents corrosion of iron-based and copper-based materials in the absorbers. The inorganic inhibitors in the form of oxidizing agent such as chromates, molybdates, etc. form dense iron oxides such as $Fe_3O_4$, etc. on the surface of iron-based material and prevent corrosion of the material by isolating the material from the corrosion environment. Silicates form a sparingly soluble precipitate film on the iron-based material, and phosphates form a compound film thereon to prevent corrosion.

Benztriazle and tolyltriazole form polymeric compounds with iron ions to cover the iron-based material, and the resulting polymeric compounds prevent corrosion. The triazole compounds likewise form sparingly soluble compound films, for example, benztriazole copper film or tolyltriazole copper film, with a copper-based material to prevent corrosion.

The high boiling organic inhibitors such as 1,3-diethyl-2-thiourea, 1-acetyl-2-thiourea, thiosinamine, etc. undergo physical adsorption on the surface of iron-based or copper-based material to isolate the material from a corrosion environment to prevent corrosion.

A mixed high boiling inhibitor, for example, a mixture of at least one of molybdates, nitrates, borates, etc. and at least one of benztrizole and tolyltriazole, forms a dense iron oxide by the inorganic inhibitor on an iron-based material, and then forms a compound film of benztriazole iron, tolyltriazole iron, etc. thereon to form a double corrosion-preventing film to attain a remarkable effect upon corrosion prevention. For a copper-based material, mainly the said triazole compounds act to prevent corrosion.

The low boiling inhibitor takes part in corrosion prevention of materials of construction in the refrigerant circulation loop, and the materials of construction, to which the low boiling inhibitor is directed, is mostly an iron-based material, that is, carbon steel and less the copper-based material. The low boiling organic inhibitor such as morpholine, pyrrolidine, piperidine, etc. undergoes physical adsorption on the surface of iron-based or copper-based material to form an isolating film to prevent corrosion.

The effective amounts of inhibitors for corrosion prevention are as follows, on the basis of the weight of an absorbing solution.

(1) High boiling inhibitor:

Chromates, molybdates, nitrates, nitrites, and tungstates: 0.1–0.2% by weight

Borates: 0.3–0.4% by weight

Ruthenium chloride: 0.005–0.03% by weight

Silicates and phosphates: 0.3–0.4% by weight

Benztriazole and tolyltriazole: 0.03–0.05% by weight 1,3-Diethyl-2-thiourea, thiosinamine, sodium thioxyanate, diphenyl thiocarbazide and 1-acetyl-2-thiourea: 0.01–0.03% by weight (2) Low boiling inhibitor:

Morpholine, pyrrolidine, piperidine and 2-methylpiperidine: 0.03–0.05% by weight Mercaptoacetic acid and isothiazole: 0.05–0.08% by weight.

BRIEF DESCRIPTION OF THE DRAWING

The single FIGURE is a schematic flow diagram showing one embodiment of a hermetically circulating, absorption-type refrigerator.

PREFERRED EMBODIMENTS OF THE INVENTION

Example 0.01% by weight of sodium molybdate and 0.03% by weight of benztriazole as high boiling inhibitors to an absorbing solution circulation loop and 0.05% by weight of morpholine as a low boiling inhibitor to a refrigerant circulation loop were added to an aqueous solution containing 54% by weight of lithium bromide and 0.2% by weight of lithium hydroxide on the basis of the absorbing solution to prepare an absorbing solution. The resulting absorbing solution was charged into a gas-fired, double effect, absorption type refrigerator of 125 refrigeration tons as shown in the FIGURE, and the refrigerator was operated under a full load for 500 hours under the following conditions:

|  | Temperature (°C.) | Pressure (mmHg) | LiBr Concentration (wt %) |
| --- | --- | --- | --- |
| High temp. regenerator | 170 | 580 | 66 |
| Low temp. regenerator | 100 | 80 | 63 |
| Condenser | 44 | 65 | — |
| Evaporator | 4.6 | 6.3 | — |
| Absorber | 45 | 6 | 60 |

After the operation, concentrations of iron ions including $Fe^{2+}$ and $Fe^{3+}$ and copper ions including $Cu^+$ and $Cu^{2+}$ and suspended matters contained in the refrigerant were investigated.

As Comparative Example, the same operation was conducted with the same absorbing solution as above except that no low boiling inhibitor was contained.

The results are given below:

|  | Ion concentration (ppm) | | |
| --- | --- | --- | --- |
|  | Iron ions | Copper ions | Suspended matters |
| The invention | 10 | 5 | None |
| Comp. Ex. | 350 | 20 | $Fe_3O_4$, $Fe(OH)_3$, and CuO |

It is obvious from the foregoing results that the corrosion of materials of construction in the refrigerant circulation loop can be effectively prevented by the low boiling inhibitor. In this connection, no difference was observed in the corrosion prevention in the absorbing solution circulation loop by the presence of the low boiling inhibitor.

Similar corrosion prevention effect could be observed in the refrigerant circulation loop in a single effect refrigerator (regenerator temperature: 120° C.) and a triple effect refrigerator (high-temperature regenerator temperature: 210° C., intermediate-temperature regenerator temperature: 160° C. and low-temperature regenerator temperature: 100° C.).

What is claimed is:

1. A hermetically circulating, absorption type refrigerator having metallic elements providing a refrigerant circulation loop comprises of a condenser and an evaporator containing water as a refrigerant and a closed circulation system comprised of a successive communication of a regenerator, the condenser, the evaporator, an absorber and a heat exchanger, refrigeration being produced by repetitions of concentration, refrigerant dilution, and heat exchange of an aqueous concentrated lithium bromide solution as an absorbing solution sealed in the circulation system, the improvement wherein said aqueous concentrated lithium bromide solution contains at least one each of (a) an inhibitor which has a boiling point higher than the solution temperature in the regenerator and which is an inorganic chromate, molybdate, nitrate, nitrite, tungstate, borate, silicate or phosphate, ruthenium chloride, benztriazole, tolyltriazole, 1,3-diethyl-2-thiourea, thiosinamine, sodium thioxyanate, diphenyl thiocarbazide, or 1-acetyl-2-thiourea and (b) an inhibitor which has a boiling point lower than the solution temperature in the regenerator and which is morpholine, pyrrolidine, 2-methylpyrrolidine, 3-methylpyrrolidine, piperidine, 2-methylpiperidine, hexamethyleneimide, mercaptoacetic acid, thiazole or isothiazole.

2. The hermetically circulating, absorption type refrigerator according to claim 1, wherein the inhibitor having a low boiling point is morpholine.

3. The hermetically circulating, absorption type refrigerator according to claim 1, wherein the aqueous absorbing solution contains sodium molybdate and benztriazole as the inhibitor having a high boiling point and morpholine as the inhibitor having a low boiling point.

4. The hermetically circulating, absorption type refrigerator according to claim 1, wherein the lithium bromide solution contains the low-boiling inhibitor at a concentration of 100 ppm by weight.

5. The hermetically circulating, absorption type refrigerator according to claim 1, wherein the aqueous absorbing solution contains 0.03–0.05% by weight of morpholine, pyrrolidine, piperidine or 2-methylpiperidine or 0.05 to 0.08% by weight of mercaptoacetic acid or isothiazole as the low-boiling inhibitor.

* * * * *